Figure 1:
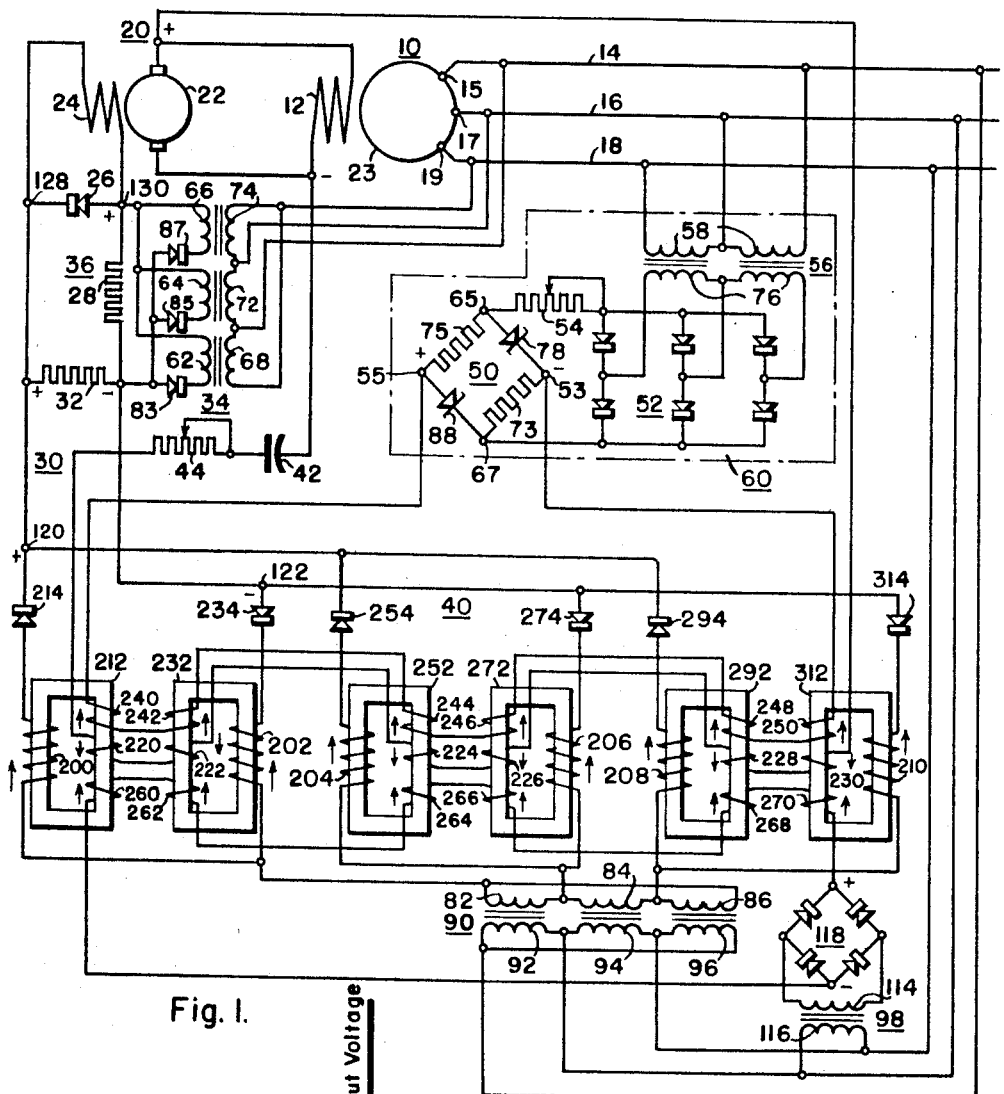

Sept. 29, 1959   D. A. BURT   2,906,940
GENERATOR REGULATOR SYSTEM
Filed Nov. 21, 1957

WITNESSES
Clement L. McHale
Wm. B. Sellers.

INVENTOR
Donald A. Burt
BY
F. E. Browder
ATTORNEY

United States Patent Office 2,906,940
Patented Sept. 29, 1959

2,906,940
GENERATOR REGULATOR SYSTEM

Donald A. Burt, Franklin Township, Westmoreland County, Pa., assignor to Westinghouse Electric Corporation, East Pittsburgh, Pa., a corporation of Pennsylvania Application November 21, 1957, Serial No. 697,957

8 Claims. (Cl. 322—28)

This invention relates to regulator systems, and more particularly, to regulator systems of the magnetic type.

A problem arises in providing a regulator system of the magnetic amplifier type for a dynamoelectric machine, such as a synchronous generator, which is subject to wide variations in speed. This is because the excitation requirements of the generator at high speeds when load is suddenly removed from the generator are very low. If the generator includes a single excitation field winding and the regulator system includes a single-ended magnetic amplifier, it has been found that undesirable voltage transients may result when a generator is operating at a high speed and the load which the generator is supplying is suddenly removed. The recovery time of such a regulator system has been found to be relatively slow. It has been found that the undesirable voltage transients which result in the latter situation may be considerably reduced and the recovery time of the regulator system reduced by supplying negative forcing in the regulator system when the generator drops load while operating at a high speed. Negative forcing in the regulator system may be provided by including a push-pull magnetic amplifier in the regulator system, as is done in certain conventional regulator systems of the magnetic amplifier type. A disadvantage of a push-pull magnetic amplifier is that it is more complex and expensive, especially where the magnetic amplifier is of the three-phase type. In addition, a push-pull magnetic amplifier is more bulky and heavier in weight which would be important disadvantages in aircraft applications. It is therefore desirable to provide negative forcing in a regulator system which includes a single-ended magnetic amplifier to control the excitation of a dynamoelectric machine, such as a synchronous generator, having a single excitation field winding and subject to wide variations in speed. Negative forcing serves to reduce the recovery time of the regulator system and improve its speed of response after the changes in operating conditions described.

An object of this invention is to provide a new and improved regulator system of the magnetic type.

A more specific object of this invention is to provide a magnetic type regulator system having an improved speed of response.

Other objects of the invention will, in part, be obvious and will, in part, appear hereinafter.

Figure 2:
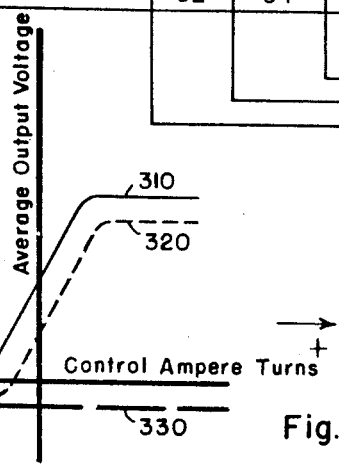

For a fuller understanding of the nature and objects of the invention, reference should be had to the following detailed description taken in connection with the accompanying drawing, in which:

Fig. 1 diagrammatically illustrates a regulator system embodying the teachings of this invention; and Fig. 2 is a graph illustrating the operation of the regulator system shown in Fig. 1.

Referring now to the drawing and Fig. 1 in particular, there is illustrated a dynamoelectric machine, specifically a synchronous generator 10 having an excitation field winding 12 and an armature 23. In this instance, the synchronous generator 10 is disposed to supply electrical power to the line conductors 14, 16 and 18 which are part of a three-phase electrical system through the output terminals 15, 17 and 19, respectively. In order to obtain an excitation voltage across the field winding 12 of the necessary magnitude, an exciter 20 is provided. The exciter 20 comprises an armature 22 which supplies current to the field winding 12 of the synchronous generator 10 and an excitation field winding 24.

In order to maintain the output voltage of the synchronous generator 10 at substantially a predetermined value, a regulator system or loop 30 comprising an error detecting circuit 60, a single-ended, three-phase magnetic amplifier 40 and the circuit means 36 for providing negative forcing, including the resistors 28 and 32, is interconnected between the output of the synchronous generator 10 and the excitation field winding 24 of the exciter 20. A commutating rectifier 26 is connected across the field winding 24 of the exciter 20 at the terminals 128 and 130 for commutating the current through the field winding 24. In other words, the rectifier 26 discharges the field winding 24 cyclically, thus preventing the flow of unwanted feedback current which would interfere with the operation of the magnetic amplifier 40.

In particular, the error detecting circuit 60 is connected at its input to the output terminals 15, 17 and 19 of the generator 10 through the line conductors 14, 16 and 18, respectively. The error detecting circuit 60 comprises a well-known bridge circuit 50, a rheostat 54, a three-phase, full-wave rectifier 52 and the potential transformers 56. The primary windings 58 of the potential transformers 56 are connected across the output terminal voltage of the generator 10 at the line conductors 14, 16 and 18. The secondary windings 76 of the potential transformers 56 are connected to the input of the full-wave rectifier 52. The output of the full-wave rectifier 52 is connected across the input terminals 65 and 67 of the bridge circuit 50, through the rheostat 54. The bridge circuit 50 includes two parallel branches, the first branch comprising the semiconductor diode 78 connected in series circuit relationship with the resistor 73 and a second branch comprising the resistor 75 connected in series circuit relationship with the semiconductor diode 88. The output voltage of the error detecting circuit 60 appears at the output terminals 53 and 55 of the bridge circuit 50. The semiconductor diodes 78 and 88 are preferably of the type known to the art as Zener diodes.

In the operation of the error detecting circuit 60, the input of the rectifier 52 is responsive to the output voltage of the generator 10 since the rectifier 52 is connected to the line conductors 14, 16 and 18 through the potential transformers 56. The direct-current output voltage therefore, of the full-wave rectifier 52 is a measure of the output terminal voltage of the generator 10. The rheostat 54 is provided in order to vary the portion of the output voltage of the full-wave rectifier 52 that is applied to the bridge circuit 50 at the input terminals 65 and 67. During operation, the direct current voltages across the semiconductor diodes 78 and 88 remain substantially constant since the reverse volatge applied to each of the semiconductor diodes 78 and 88 is always of a greater magnitude than the break-down voltage of the semiconductor diodes 78 and 88. Since the resistors 73 and 75 are of equal value, it will be seen that when a direct current voltage is imposed at terminals 65 and 67, which is equal to twice the voltage drop across each of the semiconductor diodes 78 and 88, there will be no voltage difference existing between the output terminals 53 and 55 of the error detecting circuit 20. When, however, the voltage across the input terminals 65 and 67 is either above or below the reference voltage of the bridge circuit 50, which is twice the voltage drop across each of the semiconductor diodes 78 and 88, then a voltage difference will exist between the output terminals 53 and 55 of the error detecting circuit 60. The polarity of the output voltage of the error detecting circuit 60 at the output terminals 53 and 55 will depend upon whether the input voltage is above or below the reference voltage of the bridge circuit 50. The rheostat 54 is adjusted initially to obtain the desired magnitude of output voltage from the error detecting circuit 60. The setting of the rheostat 54 is also changed to adjust the regulated value of voltage at which the regualtor system 30 maintains the output terminal voltage of the generator 10.

As previously explained, the three-phase magnetic amplifier 40 is responsive to the output error signal from the error detecting circuit 60. As illustrated, the magnetic amplifier 40 comprises the magnetic core members 212, 232, 252, 272, 292 and 312 which have disposed in inductive relationship therewith, the load windings 200, 202, 204, 206, 208 and 210, respectively. In this instance, the load windings 200, 202, 204, 206, 208 and 210 have connected in series circuit relationship therewith, the self-saturating rectifiers 214, 234, 254, 274, 294 and 314, respectively, in order to insure that current flows in one direction only through the respective load windings. As illustrated, the load windings 200, 204 and 208 are so connected to the output terminal 120 of the magnetic amplifier 40 and the load windings 202, 206 and 210 are so connected to the output terminal 122 that the output current of the magnetic amplifier 40 flows in only one direction through the field winding 24 of the exciter 20.

Energy for the load windings 200, 202, 204, 206, 208 and 210 of the magnetic amplifier 40 is received from a three-phase transformer 90 having the primary windings 92, 94 and 96, which in this instance are responsive to the output voltage of the generator 10, being connected at the line conductors 14, 16 and 18, and the secondary winding sections 82, 84 and 86.

In order to bias the magnetic amplifier 40 by a predetermined amount, the magnetic core members 212, 232, 252, 272, 292 and 312 have disposed in inductive relationship therewith the biasing windings 260, 262, 264, 266, 268 and 270, respectively. As illustrated, the biasing windings 260, 262, 264, 266, 268 and 270 are connected in series circuit relationship with one another across the output terminals of a full-wave dry type rectifier 118 whose input terminals are connected across the secondary winding 114 of the transformer 98. The primary winding 116 of the transformer 98 is responsive in turn to the output voltage of the generator 10, being connected at the line conductors 16 and 18. The biasing windings 260, 262, 264, 266, 268 and 270 are so disposed on their respective core members that current flow therethrough produces a flux which opposes the flux produced by the current flow through each of the respective load windings 200, 202, 204, 206, 208 and 210.

For the purpose of saturating the magnetic core members 212, 232, 252, 272, 292 and 312 in accordance with the output error signal from the error detecting circuit 60, the control windings 240, 242, 244, 246, 248 and 250 are disposed in inductive relationship with the core members 212, 232, 252, 272, 292 and 312, respectively. As illustrated, the control windings 240, 242, 244, 246, 248 and 250 are so disposed on their respective core members that current flow therethrough produces a flux which opposes the flux produced by the current flow through the respective load windings 200, 202, 204, 206, 208 and 210 when the output voltage of the generator 10 is above its regulated value or aids the latter flux if the output voltage of the generator 10 is below its regulated value. In this instance, the control windings 240, 242, 244, 246, 248 and 250 are connected in series circuit relationship with one another, the series circuit being electrically connected across the output terminals 53 and 55 of the error detecting circuit 60.

The damping windings 220, 222, 224, 226, 228 and 230 are disposed in inductive relationship with the magnectic core members 212, 232, 252, 272, 292 and 312 respectively, of the magnetic amplifier 40. As illustrated, the damping windings 220, 222, 224, 226, 228 and 230 are connected in series circuit relationship with one another and with the capacitor 42 and the variable resistor 44, the series circuit being connected across the armature 22 of the exciter 20. The current, therefore, which flows through the damping windings 220, 222, 224, 226, 228 and 230 varies with changes in the voltage across the armature 22 of the exciter 20. The damping windings 220, 222, 224, 226, 228 and 230 are so disposed on their respective magnetic core members that current flow therethrough produces a flux which opposes the flux produced by the current flow through the associated control windings 240, 242, 244, 246, 248 and 250, respectively.

The manner in which the load windings 200, 202, 204, 206, 208 and 210 of the magnetic amplifier 40 receive energy from the three-phase transformer 90 which includes the secondary winding sections 82, 84 and 86 can best be understood by tracing the current flow through these load windings during various phases of the output voltage of the transformer 90. Assuming that the right end of the secondary winding section 86 of the transformer 90 is at a positive polarity with respect to the left end of the secondary winding section 86, then current flows from the right end of the section 86 through the load winding 200 of the magnetic amplifier 40 and the self-saturating rectifier 214 to the terminals 120 and 128, through the field winding 24 and the resistor 28 back to the terminal 122, and then through the self-saturating rectifier 312 and the load winding 210 to the left end of the secondary winding section 86. During the next phase of the output voltage of the transformer 90 in which the right end of the secondary winding section 84 is at a positive polarity with respect to the left end of the section 84, current flows from the right end of the section 84 through the load winding 208 and the self-saturating rectifier 294 to the terminals 120 and 128, through the field winding 24 and the resistor 28 back to the output terminal 122 and then through the self-saturating rectifier 274 and the load winding 206 to the left end of the secondary winding section 84. During the next phase of the output voltage of the transformer 90 in which the right end of the secondary winding section 82 is at a positive polarity with respect to the left end of the section 82, current flows from the right end of the section 82 through the load winding 204 and the self-saturating rectifier 254 to the terminals 120 and 128, through the field winding 24 and the resistor 28 to the output terminal 122, and then through the self-saturating rectifier 234 and the load winding 202 to the left end of the secondary winding section 82. In summary, the magnetic amplifier 40 supplies a unidirectional output signal to the field winding 24 which varies with the error signal at the output terminals 53 and 55 of the error detecting circuit 60.

The operation of the regulator loop or system 30 will be described in the absence of the resistors 28 and 32, the purpose of which will be explained hereinafter. In other words, the operation will be described as if the field winding 24 were directly connected to the output terminals 120 and 122 of the magnetic amplifier 40. It is assumed that the magnetic amplifier 40 is biased to control the excitation supplied by the exciter 20 to the field winding 12 of the generator 10 so that the output voltage of the generator 10 is at its regulated value for a particular load condition of the generator 10, in the absence of an output error signal from the error detecting circuit 60. As the output voltage of the generator 10 then increases above its regulated value, the output error signal from the error detecting circuit 60 at the terminals 53 and 55 will cause current to flow through the control windings 240, 242, 244, 246, 248 and 250 in such a direction that the fluxes produced thereby oppose the fluxes produced in the respective core members 212, 232, 252, 272, 292, and 312, respectively, by current flow through the load windings 200, 202, 204, 206, 208 and 210, respectively. This reduces the net total flux in the respective core members and the output signal or current of the magnetic amplifier 40 decreases. The magnitude of the current flow through the field winding 24 of the exciter therefore decreases and the excitation current applied to the field winding 12 of the generator 10 also decreases. The latter action decreases the output voltage of the generator 10 to thereby return its output voltage to the regulated value. It should be noted that the arrows in Fig. 1 showing the direction of the fluxes produced in the respective magnetic core members produced by current flow in the respective windings are shown for the condition when the output voltage of the generator 10 is above its regulated value.

On the other hand, assuming that the output voltage of the generator 10 decreases to a value below its regulated value, the polarity of the output error signal from the error detecting circuit 60 reverses to thereby change the direction of the current flow through the control windings 240, 242, 244, 246, 248 and 250 of the magnetic amplifier 40. A change in the direction of the current flow through the control windings 240, 242, 244, 246, 248 and 250 changes the direction of the fluxes produced thereby in the respective core members 212, 232, 252, 272, 292 and 312, respectively, which fluxes aid the fluxes produced in the core members 212, 232, 252, 272, 292 and 312, respectively, by the current flow through the load windings 200, 202, 204, 206, 208 and 210, respectively, thereby increasing the output current of the magnetic amplifier 40. An increase in the output current of the magnetic amplifier 40 increases the current flow through the field winding 24 of the exciter 20 and the current flow through the field winding 12 of the generator 10, thus returning the output voltage of the generator 10 to its regulated value.

The circuit means 36 for providing negative forcing in the regulator system 30 will now be described. The circuit means 36 comprises the resistors 28 and 32, the three-phase transformer 34 and the rectifiers 83, 85 and 87. The resistor 32 is connected across the output terminals 120 and 122 of the magnetic amplifier 40. The resistor 28 is connected in series circuit relationship with the field winding 24 between the terminal 130 of the field winding 24 and the output terminal 122 of the magnetic amplifier 40. The transformer 34 and the rectifiers 83, 85 and 87 are provided as a means of causing a unidirectional current to flow through the resistor 28. The primary windings 68, 72 and 74 are responsive to the output voltage of the generator 10, said primary windings being connected at the line conductors 14, 16 and 18. The secondary windings 62, 64 and 66 of the transformer 34 are connected in a Y arrangement with the neutral of the secondary windings 62, 64 and 66 being connected at the terminal 130 on one side of the resistor 28. The other side of each of the secondary windings 62, 64 and 66 are connected through the rectifiers 83, 85 and 87, respectively, to the other side of the resistor 28 to thereby cause a unidirectional current to flow through the resistor 28 and a unidirectional voltage to appear across the resistor 28 having a substantially predetermined magnitude or average value.

In the operation of the circuit means 36, a unidirectional voltage having a predetermined polarity and a magnitude or average value which varies with the output signal or current from the single-ended magnetic amplifier 40 appears across the resistor 32. A unidirectional voltage appears across the resistor 28 which opposes or subtracts from the unidirectional voltage across the resistor 32. Assuming that the generator 10 is supplying its normal load, the voltage across the resistor 28 is relatively small compared to the voltage across the resistor 32 and the circuit means 36 has little effect upon the operation of the regulator system 30. The voltage across the resistor 28 merely subtracts from the voltage across the resistor 32 and the current through the field winding 24 of the exciter 20 varies in accordance with the difference in voltage between the unidirectional voltages across the resistors 32 and 28, respectively. The polarity of the difference voltage remains the same until the output signal from the magnetic amplifier 40 decreases to a predetermined or preselected value and then reverses because of the polarity of the voltage across the resistor 28.

The effect of the circuit means 36 on the operation of the regulator loop 30 will now be considered. Referring to Fig. 2, the curve 310 illustrates the transfer characteristic of the magnetic amplifier 40 in the absence of the circuit means 36 or the variation of the average output voltage of the magnetic amplifier 40 with the control ampere-turns which depend upon the output error signal from the error detecting circuit 60. If the generator 10 is operating at a high speed and the load is suddenly removed, it will be seen to the left of the vertical axis on the curve 310 that the output of the magnetic amplifier 40 will be reduced to a negligible value as the error signal from the error detecting circuit increases in magnitude and the control ampere-turns on the magnetic amplifier 40 increase in a negative direction. In the absence of the circuit means 36 for providing negative forcing in the regulator system 30, the output voltage of the generator 10 would then be subject to relatively large voltage transients and the recovery time of the output voltage to return to its stable regulated value would be relatively slow as determined by the operation of the regulator system 30. If, however, a negative forcing unidirectional voltage is provided by the circuit means 36 across the resistor 28 as indicated by the curve 330 in Fig. 2, the modified output voltage as supplied by the magnetic amplifier 40 and the circuit means 36 and applied to the field winding 24 of the excitere 20 will be as indicated by the curve 320 in Fig. 2. As illustrated by the curve 320, when the output voltage of the magnetic amplifier 40 decreases to a negligible value, as previously discussed, the circuit means 36 will then cause a negative forcing current to flow through the field winding 24 of the exciter 20, considerably reducing large voltage transients and reducing the recovery time of the regulator system 30 during the operation of the generator 10 when said generator is operating at a high speed and load is suddenly removed from the generator 10.

Referring to Fig. 2, the negative forcing provided by the circuit means 36, in effect, translates the transfer curve 310 of the magnetic amplifier 40 on the vertical axis to a new position as indicated by the curve 320. It has been found that for certain load conditions, the recovery time of a regulator system including a single-ended magnetic amplifier and means for obtaining negative forcing, such as the circuit means 36, has been reduced to a fraction of the recovery time of a regulator system without the negative forcing. It should be noted that any suitable means of providing a unidirectional voltage across the resistor 28 may be substituted for the transformer 34 and the rectifiers 83, 85 and 87, including a separate source of unidirectional voltage, such as a battery or a separate source of rectified alternating current. It should be noted that the resistance of the resistor 28 is relatively small compared to the resistance of the field winding 24 and the resistance of the resistor 32 is relatively large compared to the resistance of the field winding 24.

It is to be understood that other types of regulator systems including a single-ended magnetic amplifier and employing negative forcing as indicated by the teachings of this invention may be employed. It is also to be understood that a regulator system incorporating the teachings of this invention may be employed in connection with an excitation system for a dynamoelectric machine which does not include a rotating exciter but instead employs a static excitation system.

The apparatus embodying the teachings of this invention has several advantages. For example, a regulator system is provided, including a single-ended magnetic amplifier for controlling the excitation applied to a dynamoelectric machine having only one excitation field winding and subject to a wide range of operating speeds, which has an improved recovery time or speed of response when the dynamoelectric machine is operating at a relatively high speed and the load on the dynamoelectric machine is suddenly removed or reduced. In addition, a regulator system is provided including a single-ended magnetic amplifier and relatively simple means for providing negative forcing to thereby reduce the recovery time of the regulator system for certain changes in the loading of the dynamoelectric machine. Also an improved regulator system is provided with static components so that maintenance is kept to a minimum. For aircraft applications, a regulator system incorporating the teachings of this invention has the additional advantages of less weight and less size.

Since numerous changes may be made in the above-described apparatus and circuits, and different embodiments of the invention may be made without departing from the spirit thereof, it is intended that all the matter contained in the foregoing description or shown in the accompanying drawing shall be interpreted as illustrative and not in a limiting sense.

I claim as my invention:

1. In a regulator system for maintaining an electrical quantity associated with a load circuit at substantially a predetermined value, the combination comprising an error detecting circuit for obtaining an error signal which is a measure of the deviation of said electrical quantity from said predetermined value, a magnetic amplifier connected in circuit relationship with said error detecting circuit for producing a unidirectional output signal which varies with said error signal, said output signal having a predetermined polarity, a source of unidirectional current for providing an output voltage having substantially a predetermined average value, said source of unidirectional current being connected in circuit relationship with said magnetic amplifier so that said output voltage of said source subtracts from said output signal, and means responsive to the difference between said output signal and said output voltage for maintaining said electrical quantity at said predetermined value, the polarity of said difference being reversed when said output signal decreases to a preselected value.

2. In a regulator system for a dynamoelectric machine having an excitation field winding and output terminals, in combination, an error detecting circuit for producing an error signal which is a measure of the deviation of the output voltage of said dynamoelectric machine from its regulated value, a magnetic amplifier connected in circuit relationship with said error detecting circuit for producing an output signal which varies with said error signal, said output signal having a predetermined polarity, a source of unidirectional current having a substantially constant output voltage of relatively small magnitude, and first means connected in circuit relationship with said magnetic amplifier and said source of unidirectional current for applying the difference between said output signal and the output voltage of said source of unidirectional current to said excitation field winding to maintain the output voltage at substantially a predetermined value, the polarity of said difference being reversed when said output signal decreases to a preselected value to provide negative forcing for said regulator system.

3. In a regulator system for a dynamoelectric machine having an excitation field winding and output terminals connected to supply power to a varying load, the combination comprising first means for providing a reference voltage, second means for comparing said reference voltage with the output voltage of said dynamoelectric machine to obtain an error signal which is a measure of the deviation of said output voltage from its regulated value, a magnetic amplifier connected in circuit relationship with said second means for producing a unidirectional output signal which varies with said error signal, said output signal having a predetermined polarity, third means for providing substantially a predetermined unidirectional output voltage, said third means being connected in circuit relationship with said magnetic amplifier so that said unidirectional output voltage subtracts from said output signal, and fourth means responsive to the difference between said output signal and said unidirectional output voltage for controlling the excitation current applied to said excitation field to maintain said output voltage of said dynamoelectric machine at a predetermined value, the polarity of said difference between said output signal and said unidirectional output voltage being of one polarity when said output signal is above a preselected value and the opposite polarity when said output signal is below said preselected value.

4. In a regulator system for a dynamoelectric machine having an excitation field winding and output terminals, the combination comprising an error detecting circuit for obtaining an error signal which is a measure of the deviation of the output voltage of said dynamoelectric machine from its regulated value, a single-ended magnetic amplifier connected in circuit relationship with said error detecting circuit for producing a unidirectional output signal which varies with said error signal, said output signal having a predetermined polarity, a source of unidirectional current having substantially a predetermined output voltage, said source of unidirectional current being connected in circuit relationship with said magnetic amplifier so that said output voltage of said source opposes said output signal, and means for controlling the excitation current applied to said excitation field winding in accordance with the voltage difference between said output signal and said output voltage of said source to maintain the output voltage of said dynamoelectric machine at a predetermined value, the polarity of said voltage difference being reversed with respect to the predetermined polarity of said output signal when the output signal of said magnetic amplifier is substantially negligible.

5. In a regulator system for a dynamoelectric machine having an excitation field winding and output terminals, the combination comprising an error detecting circuit for producing an error signal which is a measure of the deviation of the output voltage of said dynamoelectric machine from its regulated value, a magnetic amplifier connected in circuit relationship with said error detecting circuit for producing a unidirectional output signal which varies with said error signal, first means connected in circuit relationship with said magnetic amplifier for controlling the excitation current applied to said excitation field winding in accordance with said output signal to maintain said output voltage of said dynamoelectric machine at a predetermined value, and second means for subtracting a substantially constant unidirectional voltage from said output signal to reduce the response time of said regulator system when the output voltage of said dynamoelectric machine tends to rise above its regulated value and the output signal of said magnetic amplifier decreases to a preselected value.

6. In a regulator system for a dynamoelectric machine having an excitation field winding and output terminals connected to supply power to a varying load, the combination comprising first means for providing a reference voltage, second means for comparing said reference voltage with the output voltage of said dynamoelectric machine to obtain an error signal, a single-ended magnetic amplifier connected in circuit relationship with said second means for producing a unidirectional output signal which varies with said error signal, said output signal having a predetermined polarity, third means for providing a unidirectional output voltage at substantially a predetermined value, said third means being connected in circuit relationship with said magnetic amplifier so that said unidirectional output voltage of said third means subtracts from said output signal to provide negative forcing for said regulator system when said output signal decreases to a preselected value, and fourth means responsive to the difference between said output signal and said unidirectional output voltage connected in circuit relationship with said field winding to control the excitation current applied to said excitation field winding to thereby maintain the output voltage of said dynamoelectric machine at a predetermined value.

7. In combination, first means for providing a varying input signal, a magnetic amplifier having input terminals connected in circuit relationship with said first means and output terminals for producing a unidirectional output signal which varies with said input signal, said output signal having a predetermined polarity, and second means for providing a unidirectional current having a substantially constant output voltage, said second means being connected in circuit relationship with said output terminals so that said output voltage opposes said output signal of said magnetic amplifier, the difference having a polarity opposite to said predetermined polarity of said output signal when said input signal decreases to a predetermined value.

8. In combination, a single-ended magnetic amplifier having a control winding and a load winding, first means for applying an input signal to said control winding, a first resistor connected in circuit relationship with said load winding so that a unidirectional output signal appears across said first resistor which varies with said input signal, said output signal having a predetermined polarity, a second resistor connected in circuit relationship with said first resistor, and second means for applying a unidirectional voltage across said second resistor which opposes said output signal, the difference between said output signal and said unidirectional voltage being of one polarity when said input signal is above a preselected value and the opposite polarity when said input signal is below said preselected value.

References Cited in the file of this patent
UNITED STATES PATENTS

| | | |
|---|---|---|
| 1,843,250 | Spencer | Feb. 2, 1932 |
| 2,525,451 | Graves | Oct. 10, 1950 |
| 2,714,172 | Bretch | July 26, 1955 |